(12) United States Patent
Heideman et al.

(10) Patent No.: US 8,718,432 B1
(45) Date of Patent: May 6, 2014

(54) METHOD FOR FORMING A SPOTSIZE CONVERTER

(75) Inventors: Rene Gerrit Heideman, Oldenzaal (NL); Marcel Hoekman, Enschede (NL)

(73) Assignee: Octrolix BV (NL)

( * ) Notice: Subject to any disclaimer, the term of this patent is extended or adjusted under 35 U.S.C. 154(b) by 0 days.

(21) Appl. No.: 13/451,957

(22) Filed: Apr. 20, 2012

Related U.S. Application Data

(60) Provisional application No. 61/477,960, filed on Apr. 21, 2011.

(51) Int. Cl.
*G02B 6/10* (2006.01)

(52) U.S. Cl.
USPC .......................................... 385/131; 216/13

(58) Field of Classification Search
USPC .......................................... 385/131; 216/13
See application file for complete search history.

(56) References Cited

U.S. PATENT DOCUMENTS

| | | | |
|---|---|---|---|
| 6,052,397 A * | 4/2000 | Jeon et al. .................. 372/46.01 |
| 6,174,748 B1 * | 1/2001 | Jeon et al. ......................... 438/31 |
| 6,809,019 B2 * | 10/2004 | Hartner et al. ................. 438/593 |
| 6,862,300 B1 * | 3/2005 | Traut et al. ....................... 372/19 |
| 6,937,779 B2 * | 8/2005 | Oguro .............................. 385/14 |
| 7,146,087 B2 * | 12/2006 | Heideman et al. ............. 385/131 |
| 7,158,701 B2 * | 1/2007 | Dautartas .......................... 385/37 |
| 2003/0002793 A1 * | 1/2003 | Dautartas .......................... 385/37 |
| 2003/0108319 A1 * | 6/2003 | Chong et al. ................... 385/129 |
| 2003/0111439 A1 * | 6/2003 | Fetter et al. ....................... 216/13 |
| 2005/0098855 A1 * | 5/2005 | Shimoji et al. ................. 257/621 |
| 2005/0152660 A1 * | 7/2005 | Heideman et al. ............. 385/131 |
| 2005/0179508 A1 * | 8/2005 | Sato .................................. 333/187 |
| 2007/0020934 A1 * | 1/2007 | Gaidis et al. ................... 438/689 |
| 2007/0037307 A1 * | 2/2007 | Donofrio ......................... 438/42 |
| 2007/0041703 A1 * | 2/2007 | Wang .............................. 385/147 |
| 2008/0303042 A1 * | 12/2008 | Minato et al. .................... 257/98 |

OTHER PUBLICATIONS

Brenner et al., "Local Etch-Rate Control of Masked InP/InGaAsP by Diffusion-Limited Etching," J. ELectrochem. Soc. V. 141, N. 7, 1994, p. 1954.*

Jeong et al., "Low-Loss Compact Arrayed Waveguide Grating with Spot-Size Converter Fabricated by a Shadow-Mask Etching Technique", "ETRI Journal", Feb. 2005, pp. 89-94, vol. 27, No. 1, Publisher: Electronics and Telecommunications Research Institute (ETRI), Published in: KR.

Dong et al., "Low loss shallow-ridge silicon waveguides", "Optics Express", Jul. 5, 2010, pp. 14474-14479, vol. 18, No. 14, Publisher: Optical Society of America.

(Continued)

*Primary Examiner* — Charlie Peng
*Assistant Examiner* — Peter Radkowski
(74) *Attorney, Agent, or Firm* — Kaplan, Breyer, Schwarz & Ottesen, LLP

(57) ABSTRACT

A method for forming a tapered region in a first layer of a first material is disclosed. The method comprises forming an accelerator layer of a second material on the first layer and forming a mask layer disposed on the accelerator layer. The accelerator layer is exposed to a first etch that removes the second material in a first region and laterally etches the accelerator layer along a second region to expose the first layer in the second region to the first etch. Since the time for which the first layer is exposed to the first etch in the second region is based on the progress of the lateral etch of the accelerator layer, the first etch tapers the first layer in the second region.

28 Claims, 10 Drawing Sheets

(56) References Cited

OTHER PUBLICATIONS

Mizuno et al., "Optical Spotsize Converter Using Narrow Laterally Tapered Waveguide for Planar Lightwave Circuits", "Journal of Lightwave Technology", 2004, p. 833 vol. 22, No. 3, Publisher: IEE.

Notomi et al., "Photonic Crystals: Towards Utrasmall Lightwave Circuits", "NTT Technical Review", Feb. 2004, vol. 2, No. 2, Publisher: Nippon Telegraph and Telephone.

Tsuchizawa et al., "Spot-size converters for rib-type silicon photonic wire waveguides", "2008 5th IEEE International Conference on Goup IV Photonics IEEE Xplore Digital Library", Sep. 17-19, 2008, Publisher: IEEE.

Li et al., "Monolithically integrated low-loss three-dimensional spot-size converter and silicon photonic waveguides constructed by", "Journal of Micro/Nanolithography, MEMS and MOEMS", Apr. 13, 2011, vol. 10, No. 2, Publisher: Society of Photo-Optical Instrumentation Engineers (SPIE) Digital Library.

Shinya et al., "Spot-size Converter of Photonic Crystal Waveguide", "http://www.brl.ntt.co.jp/E/activities/file/report02/E/report20.html".

* cited by examiner

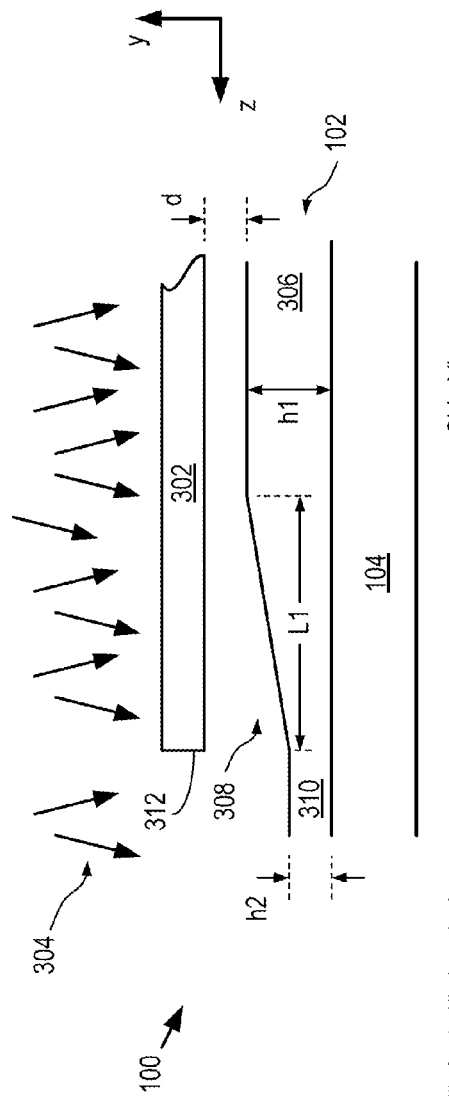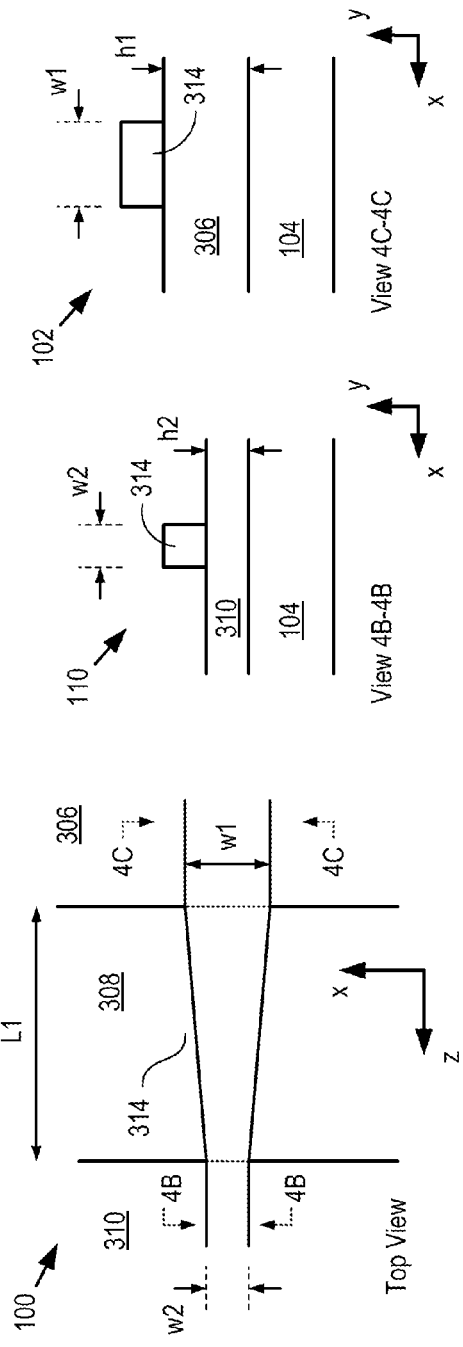

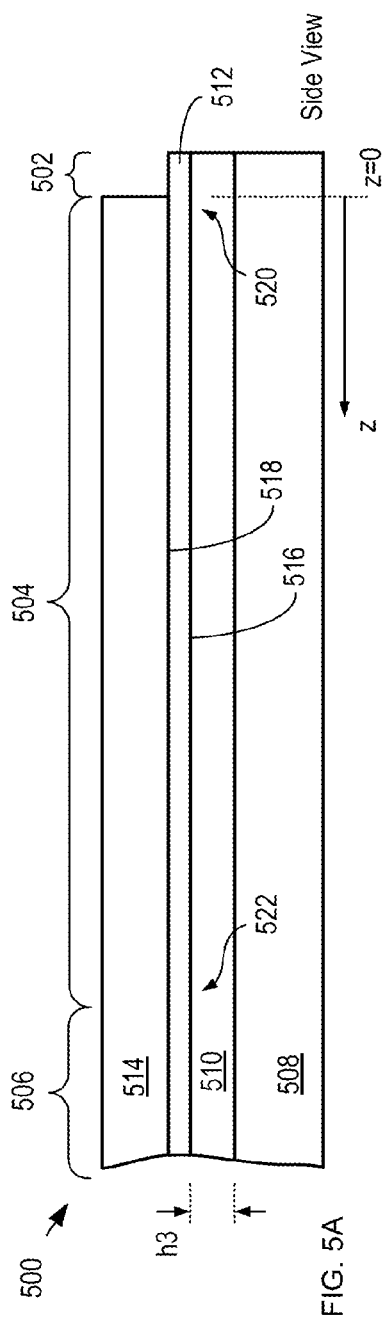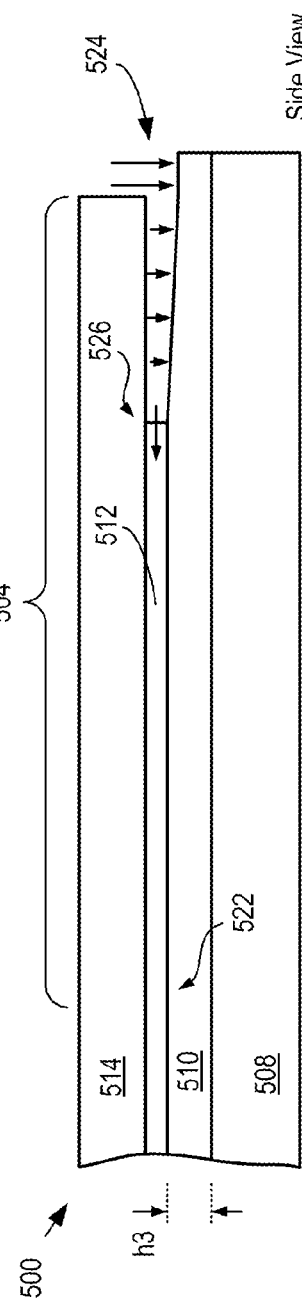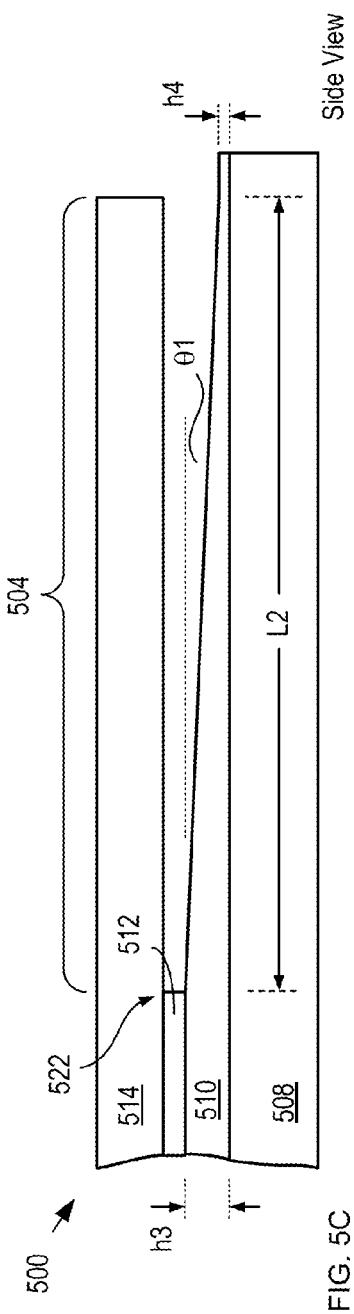

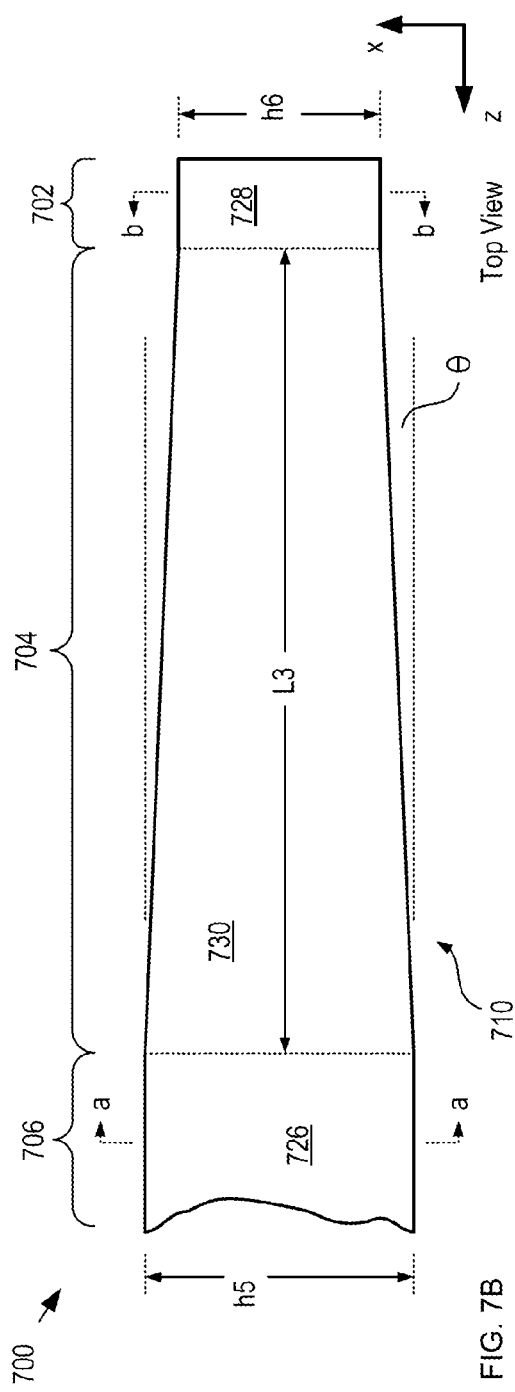
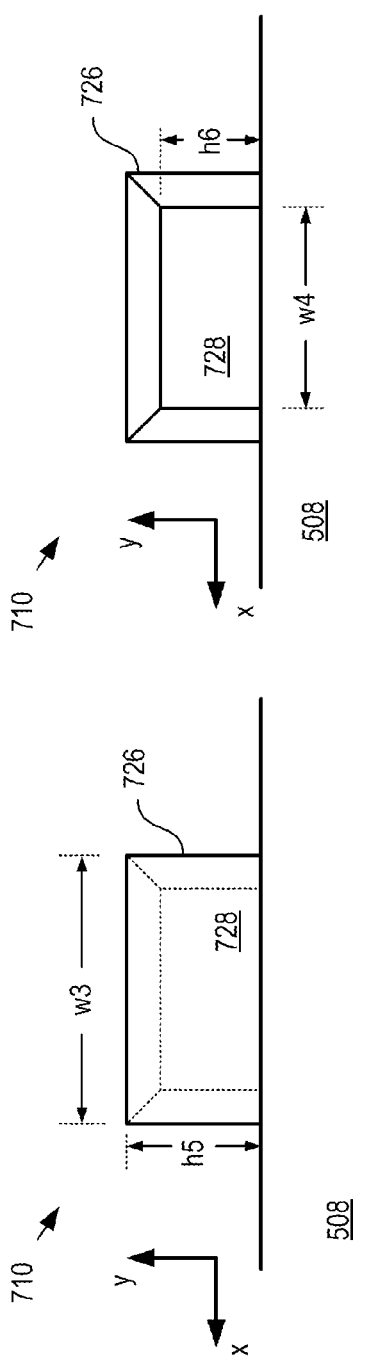
FIG. 7B
FIG. 7C  View a-a of FIG. 7B
FIG. 7D  View b-b of FIG. 7B

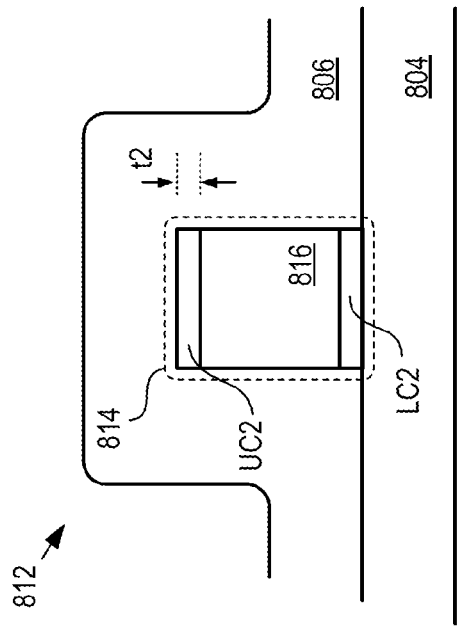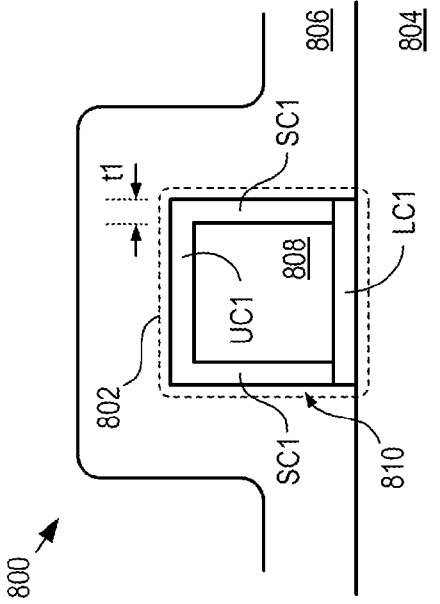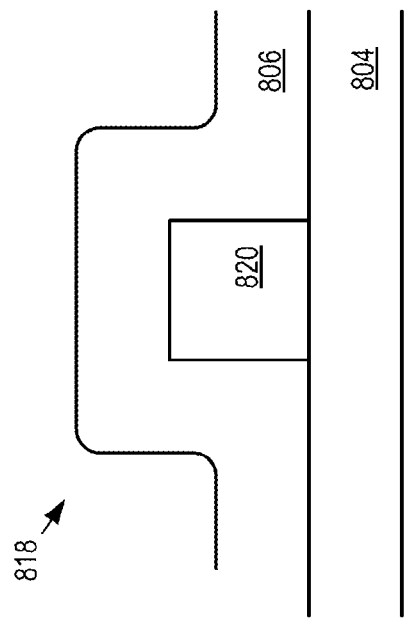

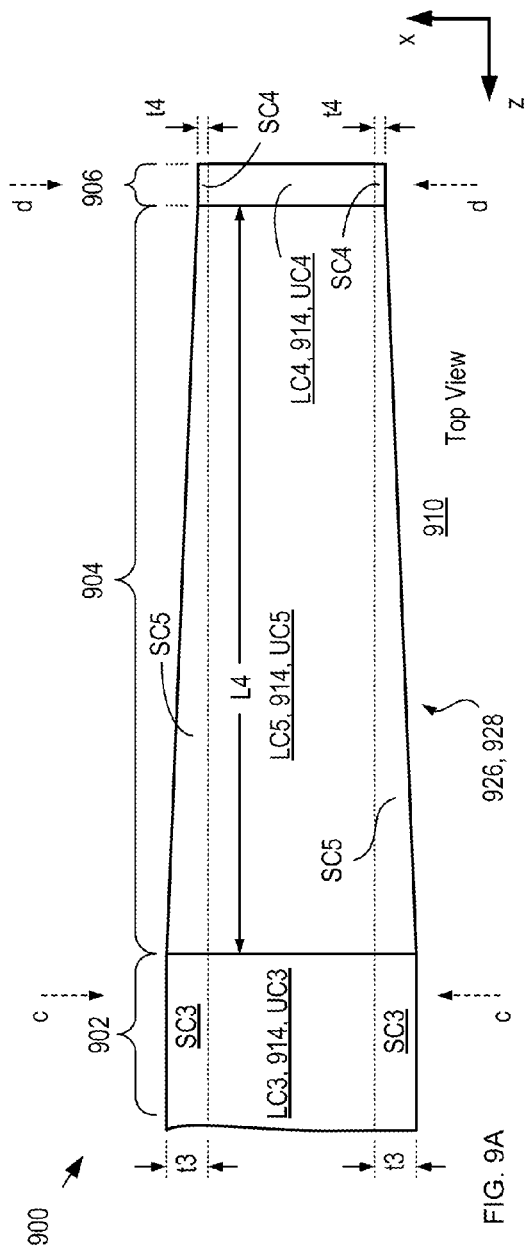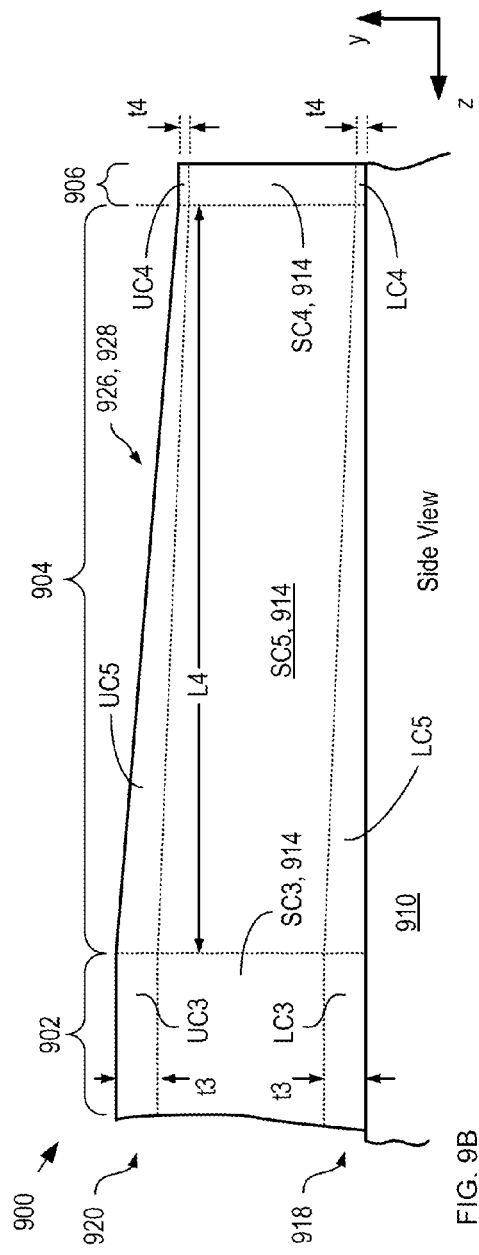

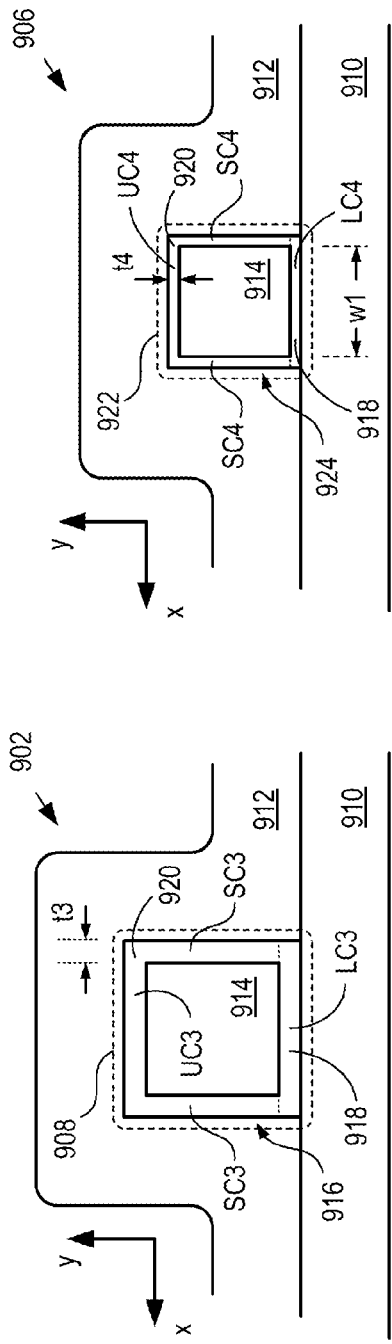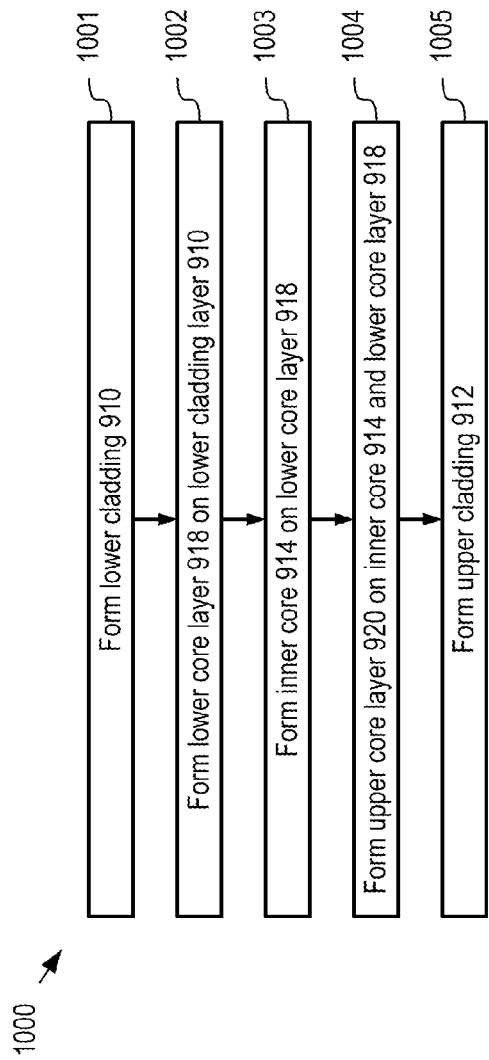

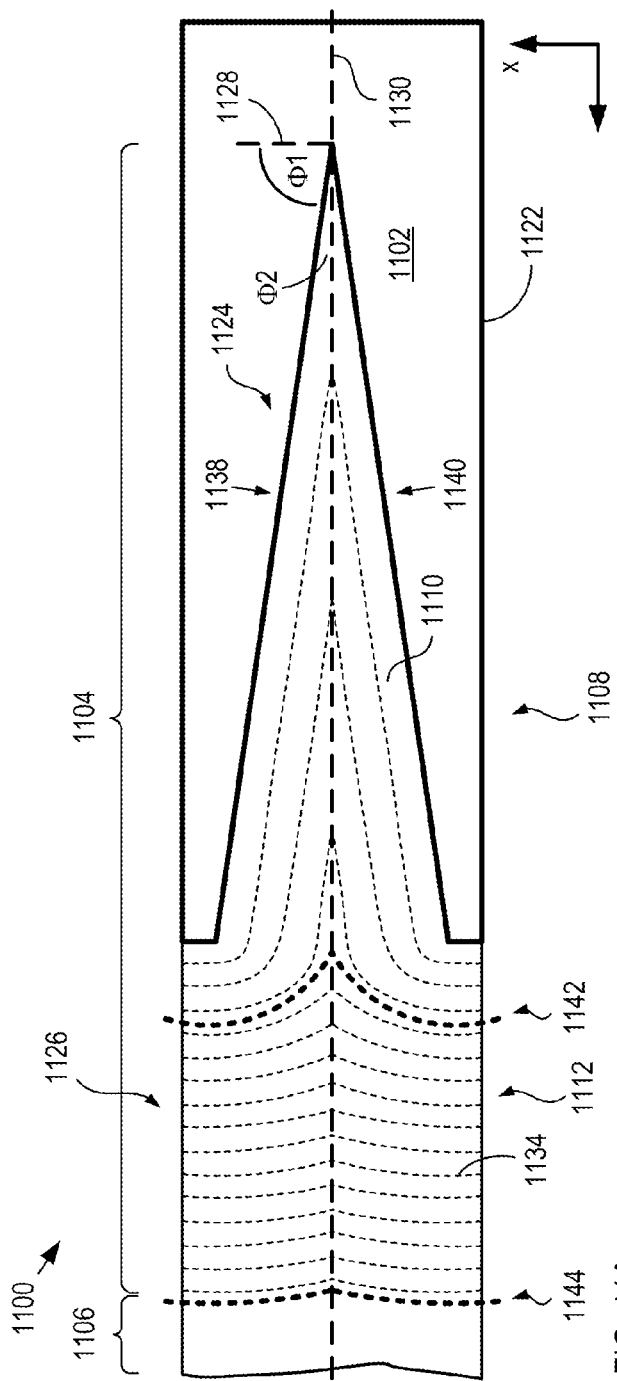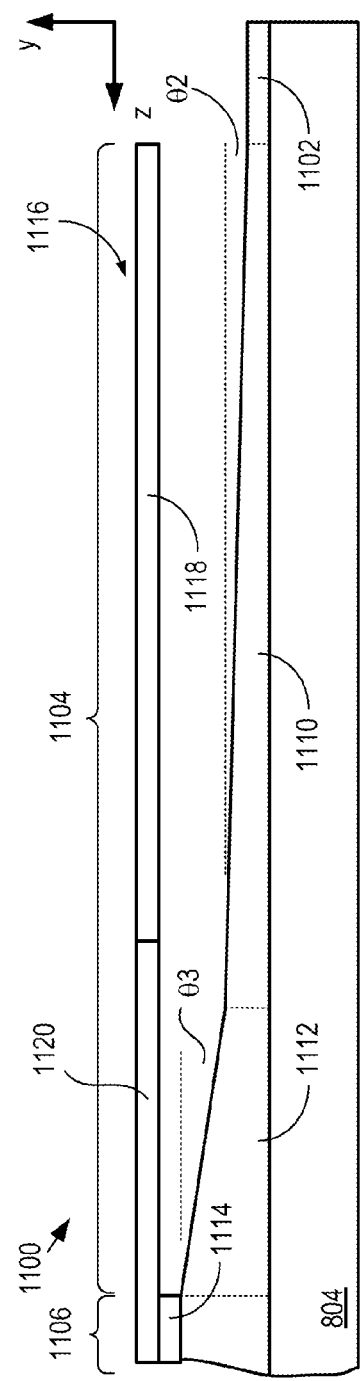
FIG. 11A
FIG. 11B

METHOD FOR FORMING A SPOTSIZE CONVERTER

CROSS-REFERENCE TO RELATED APPLICATION

This application claims the benefit of U.S. Provisional Application Ser. No. 61/477,960, filed Apr. 21, 2011, entitled "Surface Waveguide-based Spot-size Converter,", which is incorporated by reference.

FIELD OF THE INVENTION

The present invention relates to guided-wave optics in general, and, more particularly, to planar lightwave circuits.

BACKGROUND OF THE INVENTION

An optical waveguide is a light pipe capable of guiding a light signal along a path that can include curves, loops, etc. without a significant loss of optical energy from the signal. Typically, a waveguide includes a central core of substantially transparent material that is surrounded by cladding material whose refractive index is lower than that of the core material. This refractive index difference contains the bulk of the optical energy of the signal within the waveguide core. The most common optical waveguides include glass-based optical fibers (typically used for simple transmission of light from one place to another) and surface waveguides formed on rigid substrates, such as glass or silicon. Surface waveguides offer the promise of greater functionality than simple optical fibers by virtue of their ability to readily include more complex structures, such as ring resonators, 1×N couplers and splitters (where N can be 2, 3, or more), and the like, which are difficult to realize in optical fibers. Often, multiple surface waveguides are formed on a single substrate to collectively define a planar lightwave circuit (PLC).

The "mode" of the light signal propagates primarily within the core, although a portion (its "evanescent field") extends into the cladding. The shape of the mode and the size of the evanescent field depend strongly on the design of the waveguide. Factors such as waveguide design (i.e., cross-sectional shape), index contrast (i.e., the refractive index difference between the core and cladding), core size, and cladding thickness all impact how strongly the light is confined in the core, as well as the shape and size of the optical mode (i.e., mode profile and mode-field size).

In waveguides having only a small difference between the refractive indices of the core and cladding material (referred to as "low-contrast waveguides"), light is loosely confined in the core and the evanescent field is relatively large. The optical propagation loss of such waveguides can be very low; therefore, low-contrast waveguides are preferred in applications where low propagation loss is critical, such as for transmission in optical telecom or datacom systems. In such systems, the vast majority of waveguides used are "communications-grade" optical fibers, which are typically characterized by very low contrast and very low optical propagation loss. Such optical fibers typically provide little optical functionality other than simply conveying light signals from one place to another. Surface waveguides, however, offer greater functionality and can be fabricated in a range of index contrasts from low-contrast surface waveguides through high-contrast surface waveguides.

Low-contrast surface waveguides typically exhibit optical propagation loss that is somewhat higher than that of a typical communications-grade optical fibers, but can also enable low-loss waveguide crossings, optical power splitting, and optical power coupling, which are difficult to achieve using optical fibers. Unfortunately, because they only loosely confine light signals, low-contrast surface waveguides are susceptible to severe losses at waveguide bends, as well as disruption from optical signals propagating in nearby low-contrast surface waveguides. Low-contrast surface waveguides, therefore, typically require large bending radii and are not well suited for use in high-density PLCs. As a result, low-contrast surface waveguide systems require a large chip area, which increases their cost. A low-contrast surface waveguide can be designed with a propagation mode that substantially matches the mode profile and mode-field size of an optical fiber, however, which reduces the optical loss that arises when a light signal is transferred between the surface waveguide and the optical fiber. They are attractive, therefore, for combined systems where a low-contrast surface waveguide is optically coupled with an optical fiber to add functionality to a low-loss optical system.

High-contrast surface waveguides (i.e., surface waveguides having a large difference between the refractive indices of the core and cladding material) tightly confine a light signal in the core such that its evanescent field is relatively small. This enables high-contrast surface waveguides to have extremely small bending radii and be located quite close to other high-contrast waveguides without incurring significant signal degradation. As a result, high-contrast waveguides enable complex circuit functionality in a small chip area and are well suited to large-scale integration PLCs having densely packed surface waveguides. Unfortunately, high-contrast waveguides typically have relatively higher optical propagation loss. Their use, therefore, has historically been limited to applications where functionality is more important than low loss, such as sensors, power splitters, and the like. In addition, the mode profile of a high-contrast surface waveguide is not well matched to that of an optical fiber; therefore, the optical loss that arises when a light signal is transferred between a high-contrast surface waveguide and an optical fiber is typically quite large. As a result, they are not well suited for combined systems where a high-contrast surface waveguide is optically coupled with an optical fiber.

In some cases, it is desirable to have both high-contrast surface waveguides and low-contrast surface waveguides in the same PLC. One way to enable this is through the use of a spotsize converter, sometimes referred to as a mode-field converter. In addition, a spotsize converter can enable the use of a high-contrast waveguide-based PLC with a conventional optical fiber by changing the mode profile of the high-contrast surface waveguide to more closely match that of the optical fiber, thereby reducing fiber-to-chip coupling loss.

Attempts to form a PLC-based spotsize converter in the prior art have typically relied on waveguides regions comprising a one-dimensional taper in the lateral dimension, wherein the lateral taper is formed using conventional photolithography and etching. Examples of such devices are described in "Optical spotsize converter using narrow laterally tapered waveguide for Planar Lightwave Circuits," *J. Lightwave Tech.*, Vol. 22, pp. 833-839 (2004). While some improvement in coupling performance is achieved with this approach, the performance and flexibility of these devices is limited because the mode-field can only be controlled in one dimension.

Silicon-core waveguides whose cores are tapered in one dimension have also been investigated in the prior art, such as is described in "Spotsize converters for rib-type silicon photonic wire waveguides," *Proceedings of the 5$^{th}$ International Conference on Group IV Photonics*, Sorrento, Italy, September 17-19, pp. 200-202 (2008) and "Low loss shallow-ridge silicon waveguides," *Optics Express*, Vol. 18, No. 14, pp. 14474-14479 (2010). Unfortunately, while the promise of compatibility with conventional integrated circuits is attractive, the operating wavelengths and propagation losses for silicon-core waveguides limit their use in many applications.

In similar fashion, optical coupling between an optical fiber and a photonic crystal waveguide via a laterally tapered silicon-wire waveguide region was demonstrated in "Spotsize converter of Photonic Crystal Waveguide," *NTT Technical Review*, Vol. 2, pp. 36-47 (2004).

Of more promise, however, are mode-field conversion regions formed in waveguides that are tapered in two dimensions, such as described in "Low-Loss Compact Arrayed Waveguide Grating with Spot-size Converter Fabricated by a Shadow-Mask Etching Technique," *Electronics and Telecommunications Research Institute (ETRI) Journal*, Vol. 27, No. 1, pp. 89-94 (2005). While the structure of these spotsize converters shows great promise for low fiber-to-chip coupling losses, shadow-mask etching is extremely difficult to control. As a result, spotsize converters fabricated in this manner are expensive to produce in volume and are likely to suffer from variations in performance as well, making them difficult, at best, to commercialize.

An improved method forming low-cost, commercially viable spotsize converters that are operable over a wide range of wavelengths would, therefore, be highly desirable.

SUMMARY OF THE INVENTION

The present invention enables a surface waveguide-based spotsize converter having a mode-transition region that is tapered in one or two dimensions, wherein the mode-transition region is shaped via a simple and controllable tapering technique that is commercially viable. Embodiments of the present invention are well suited for use in low-loss fiber-to-chip couplers, stand-alone spotsize converters, and fiber-to-fiber optical couplers, as well as for use within a PLC to adiabatically couple waveguide regions having different index contrast.

A spotsize converter in accordance with the present invention comprises a first region having a first mode-field size a second region having a second mode-field size, and a mode-transition region that optically couples the first and second region, wherein the transition region is tapered in at least one dimension along the length between the first and second regions.

Spotsize converters comprising tapered regions are known in the prior art; however, prior-art tapered regions are either tapered in only the lateral dimension or are tapered vertically using complicated and unreliable methods, such as shadow-mask etching. In contrast to the prior art, the present invention provides a tapered region that is (1) readily tapered in two dimensions and (2) is formed using a highly controllable etch method that is well suited to high volume production.

In an illustrative embodiment, a tapered transition region is formed via an accelerator layer that etches laterally in an etchant. The accelerator layer is disposed on a surface of an underlying first layer, whose material is also etched by the etchant. As the etch front in the accelerator layer proceeds laterally from a first point, a steadily increasing amount of surface area of the first layer becomes exposed to the etchant. As a result, the duration of exposure to the etchant for the surface depends linearly on distance from the first point. The lateral etch front moves at a substantially steady rate, which leads to a substantially linear tapering of the first layer in the tapered region. The taper angle is controlled by controlling the relative etch rates of the materials of the accelerator layer and the first layer in the etchant.

The illustrative embodiment of the present invention comprises a box-shaped multi-core waveguide that comprises a first region, second region, and third region that is between the first region and second region. The multi-core waveguide comprises an inner core of silicon dioxide and an outer core of silicon nitride that substantially uniformly surrounds the inner core. The outer core has a thickness in the first region that is approximately 20 nm. The outer core has a thickness in the second region that is approximately 200 nm. The thickness of the outer core in the third region changes substantially linearly from 20 nm where it meets the first region to 200 nm where the outer core meets the second region.

In order to form the taper in the third region, an accelerator layer is disposed on the outer core. A mask layer is then formed on the accelerator layer such that the mask layer exposes the accelerator layer material in the first region but protects the surface of the accelerator layer in the second and third regions. The materials are then exposed to an etchant that etches the accelerator layer material at a faster rate than the outer core material. As a result, the etchant removes the accelerator later material in the first region and begins to attack the outer core material. The etchant also begins to undercut the mask layer in the third region by laterally etching the accelerator material under the mask. As the etch front of the etchant proceeds laterally from where the first and third regions meet, more outer core material is exposed to the etchant. Since the etch front proceeds at a substantially constant speed, the amount of time the outer core material in the third region is exposed to the etchant decreases linearly with distance from the first region.

In some embodiments, a taper region comprises multiple sub-regions that are tapered with different taper angles. In such embodiments, the taper region has a thickness that changes monotonically along its length. In some embodiments, the thickness of the taper region changes monotonically along its length in a non-linear fashion.

An embodiment of the present invention comprises a method comprising: providing a first layer of a first material, wherein the first material etches at a first etch rate in a first etchant; providing an accelerator layer disposed on the first layer, the accelerator layer comprising a second material, wherein the second material etches at a second etch rate in the first etchant; providing a mask layer, wherein the mask layer is disposed on the accelerator layer in a first region; enabling the first etchant to laterally etch the accelerator layer from a first point in the first region to a second point in the first region such that the first layer is exposed to the first etchant for a longer period of time at the first point than at the second point, wherein the first etchant laterally etches the accelerator layer at a first lateral etch rate along a first lateral direction from the first point to the second point; and etching the first layer in the first region such that a first dimension of the first layer increases substantially linearly from the first point to the second point.

BRIEF DESCRIPTION OF THE DRAWINGS

FIG. 3 depicts an arrangement of core layer 102 and shadow mask 302 during the formation of ramp 308.

FIG. 4A depicts a schematic drawing of a top view of nascent spotsize converter 100 after formation of mask layer 314.

FIGS. 4B-C depict schematic drawings cross-sectional views of nascent interface 110 and nascent waveguide 106, respectively, after formation of mask layer 314.

FIGS. 5A-C depict schematic drawings of side views of a substrate region comprising a tapered region at different points during an exemplary accelerator-layer tapering process in accordance with the present invention.

FIG. 7B depicts a schematic drawing of a top view of substrate region 700 after operation 806 and after the removal of the remaining areas of accelerator layer 712 and mask layer 714.

FIGS. 7C and 7D depict schematic drawings of cross-sectional views of layer 710 through lines a-a and b-b, respectively.

FIGS. 8A-C depict schematic drawings cross-sectional views of a selection of exemplary waveguide structures suitable for use with the present invention.

FIGS. 9A and 9B depict schematic diagrams of top and side views, respectively, of a surface waveguide-based spotsize converter formed using accelerator-layer tapering in accordance with an illustrative embodiment of the present invention.

FIGS. 9C and 9D depict schematic diagrams of cross-sectional views through lines c-c and d-d, respectively, of spotsize converter 900.

FIG. 10 depicts operations of a method suitable for forming a spotsize converter in accordance with the illustrative embodiment of the present invention.

FIGS. 11A and 11B depict schematic drawings of top and side views, respectively, of a tapered waveguide core of a spotsize converter in accordance with an alternative embodiment of the present invention.

DETAILED DESCRIPTION

The following terms are defined for use in this Specification, including the appended claims:

Disposed on or Formed on is defined as "exists on" an underlying material or layer. A first layer can be disposed on a second layer with intermediate layers, such as transitional layers, separating the first layer and second layer. For example, if a material is described to be "disposed (or grown) on a substrate," this can mean that either (1) the material is in intimate contact with the substrate; or (2) the material is in contact with one or more intermediate layers that reside on the substrate.

Monotonically is defined as only increasing or decreasing. In other words, the first derivative of a monotonically changing function never changes sign. For example, a layer whose thickness increases monotonically along a first direction has a thickness that never decreases along the first direction. It should be noted that the thickness of a layer can change in either a linear or non-linear fashion and still be considered to be changing monotonically.

As discussed above, the design parameters of a surface waveguide (i.e., cross-sectional shape, core size, core and cladding materials, index contrast, cladding thickness, etc. dictate the mode propagation characteristics of the waveguide. (i.e., mode profile, mode-field size, mode confinement, etc.). As a result, by changing one or more of these parameters along a transition region within a surface waveguide, the mode propagation characteristics (e.g., mode profile, mode-field size, etc.) of the waveguide can be converted as desired.

Figures 1, 2:
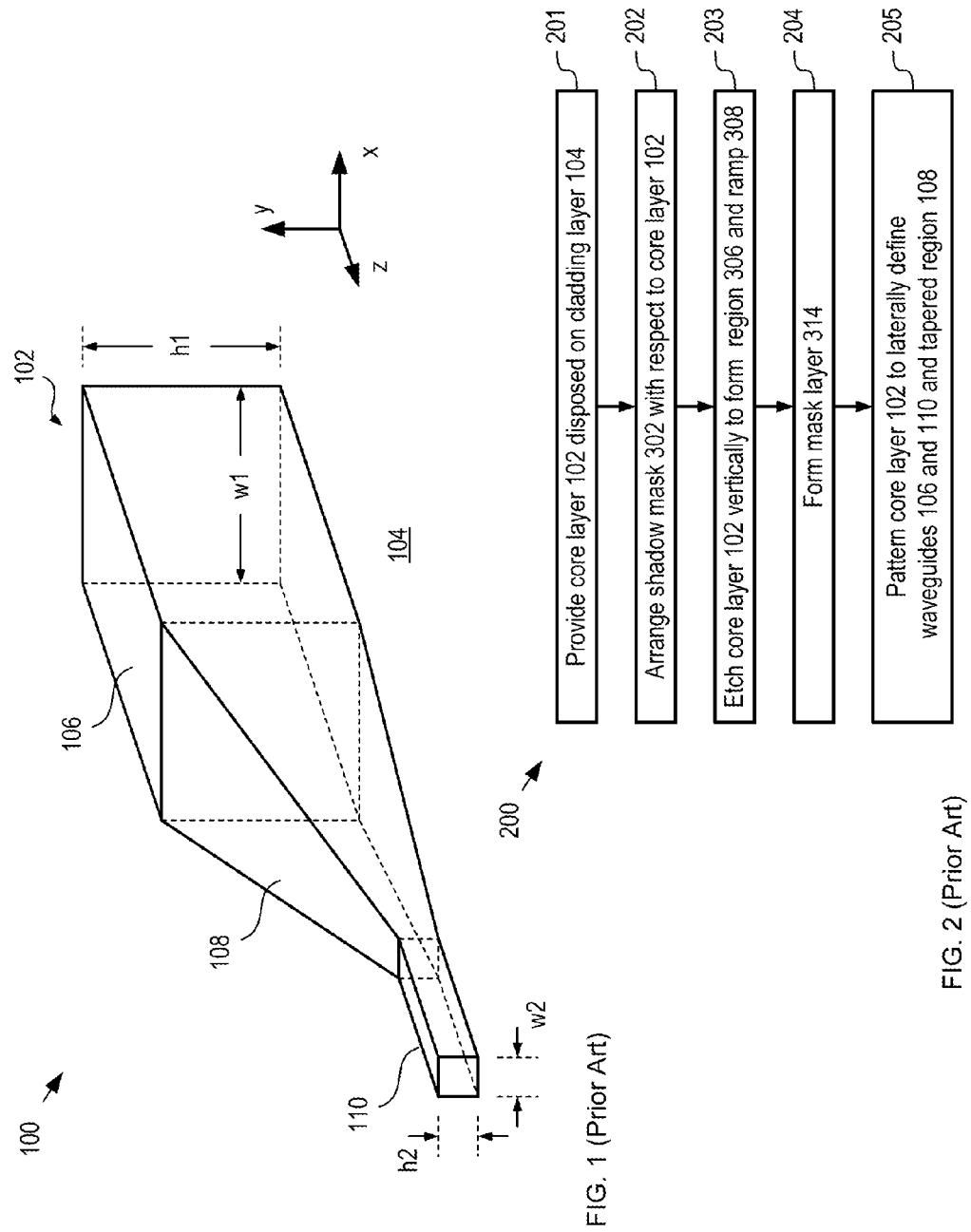
FIG. 1 depicts a schematic drawing of a perspective view of the core of a surface waveguide-based spotsize converter in accordance with the prior art.
FIG. 2 depicts operations of a prior-art method for forming spotsize converter 100.

FIG. 1 depicts a schematic drawing of a perspective view of the core of a surface waveguide-based spotsize converter in accordance with the prior art. Spotsize converter 100 comprises waveguide 106, taper region 108, and interface 110. Spotsize converter 100 enables optical coupling of waveguide 106 with a conventional single-mode optical fiber by changing the optical mode-field size from that of waveguide 106 to a one that better matches the optical mode-field size of the optical fiber. For clarity, spotsize converter 100 is depicted without its upper cladding layer.

Waveguide 106 is a surface waveguide having an index contrast of approximately 1.5%.

Interface 110 is a reduced-dimension portion of the waveguide that provides a mode profile suitable for optical coupling with a standard single-mode fiber with loss that is lower than the fiber-to-chip coupling loss associated with waveguide 106.

Taper region 108 is a region wherein the structure of the waveguide core is down-tapered both vertically and laterally from that of waveguide 106 to that of interface 110.

FIG. 2 depicts operations of a prior-art method for forming spotsize converter 100. Method 200 begins with operation 201, wherein conventional silica core layer 102 is formed on lower cladding layer 104 via plasma-enhanced chemical vapor deposition (PECVD). As deposited, core layer 102 has thickness, h1. FIG. 2 is described with continuing reference to FIG. 1 as well as reference to FIGS. 3 and 4.

Lower cladding layer 104 is a typically a layer of thermally grown silicon dioxide that is several microns thick.

At operation 202, shadow mask 302 is positioned relative to core layer 102 to enable formation of ramp 308 and region 310.

Shadow mask 302 is a mask for protecting regions of core layer 102 from attack by reactive ion etch 304. Shadow mask 302 is held above core layer 102 by separation distance, d.

At operation 203, core layer 102 is etched in reactive-ion etch 304. During operation 203, where core layer 102 is fully exposed by shadow mask 302 (i.e., in region 310), core layer 102 is etched to thickness h2. Where core layer 102 is fully protected by shadow mask 302 (i.e., in region 306), core layer 102 remains at thickness h1 after operation 203. Near edge 312 of shadow mask (i.e., along the distance L1), however, the separation of core layer 102 and shadow mask 302 by d enables etch 304 to attack core layer 102 and etch it to a depth that depends on the distance from edge 312 along the distance L1—thus creating ramp 308.

FIG. 3 depicts an arrangement of core layer 102 and shadow mask 302 during the formation of ramp 308.

At operation 204, mask layer 314 is formed on core layer 102.

FIG. 4A depicts a schematic drawing of a top view of nascent spotsize converter 100 after formation of mask layer 314.

FIGS. 4B-C depict schematic drawings cross-sectional views of nascent interface 110 and nascent waveguide 106, respectively, after formation of mask layer 314.

At operation 205, core layer 102 is etched in a second reactive-ion etch operation to define the lateral dimensions spotsize converter 100.

Although method 200 is suitable for forming a spotsize converter having a region that is tapered in two dimensions, this approach is quite limited in its utility in a commercial fabrication process for several reasons.

First, method 200 requires two separate masking and etching steps. In a manufacturing environment, each required step adds complexity and expense. Further, the additional handling leads to reduced yield and, therefore, even more expense.

Second, while shadow-mask etching has been shown to be able to produce a reasonably linear ramp structure in a research environment, it is very difficult to control and reproduce. The shape of the taper region depends on many factors, such as mask separation distance, d, chamber pressure, etch gas flow rate, pump speed, substrate heating, and mass transport of etch gas under the shadow mask, a linear etch profile is extremely difficult to achieve. As a result, it is not well suited for high-volume commercial use.

Third, the distance of the taper, L1, is limited by the achievable undercut distance of the shadow mask and, therefore, cannot be made arbitrarily long. Taper length is an important parameter for achieving adiabatic mode-conversion. As a result, the use of shadow-mask etching to form ramp 308 constrains the range of design for the surface waveguides in spotsize converter 100.

In contrast to method 200, it is an aspect of the present invention that a taper region is formed via a process referred to herein as "accelerator-layer tapering." Accelerator-layer tapering is a potentially single-step etch process that can produce substantially linear taper regions of nearly any practical length in a repeatable, low-cost, and commercially viable manner.

Accelerator-Layer Tapering

Accelerator-layer tapering was developed as an aspect of the present invention to enable the formation of one- or two-dimensional taper regions in a material layer. This process uses an "accelerator layer" formed on a first layer to controllably expose a surface of the first layer to an etchant for an amount of time that is a function of position on the substrate. Accelerator-layer tapering can be used to form a one-dimensional taper in a region of the first layer. It can also be used to form a two-dimensional tapered region in a single operation. An example of the accelerator-layer tapering process is described here.

FIGS. 5A-C depict schematic drawings of side views of a substrate region comprising a tapered region at different points during an exemplary accelerator-layer tapering process in accordance with the present invention. Substrate region 500 includes regions 502, 504, and 506, each of which includes substrate 508 and layer 510.

Figure 6:
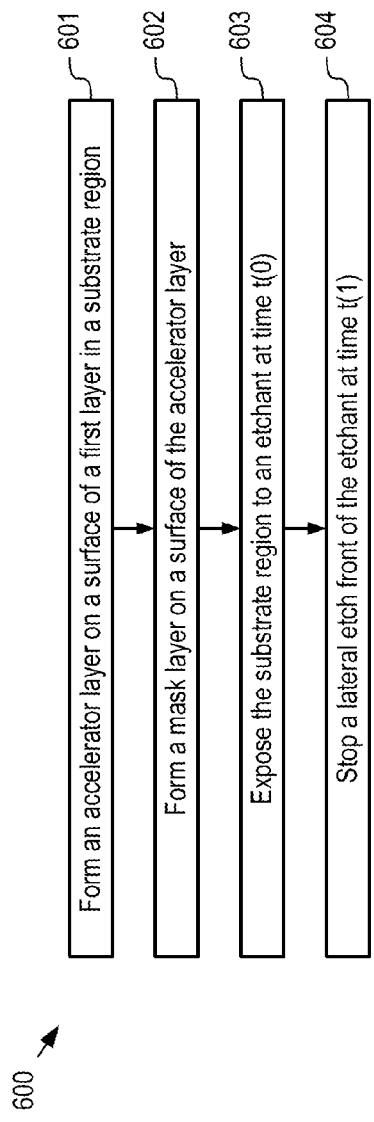
FIG. 6 depicts operations of a method suitable for fabrication of a tapered region in accordance with the present invention.

FIG. 6 depicts operations of a method suitable for fabrication of a tapered region in accordance with the present invention. FIG. 6 is described with continuing reference to FIGS. 5A-C.

Method 600 begins with operation 601, wherein accelerator layer 512 is formed on surface 516 of layer 510. Layer 510 is a planar layer of stoichiometric silicon nitride having a thickness, h3.

Although layer 510 comprises silicon nitride in this example, it will be clear to one skilled in the art, after reading this Specification, that the accelerator-layer tapering process is suitable for tapering any layer of material whose structure does not inhibit substantially uniform etch rate in all dimensions. Materials for which an accelerator-layer tapering process is suitable include, without limitation, dielectrics, silicon oxides, glasses, plastics, ceramics, silicon, polysilicon, amorphous silicon, amorphous and polycrystalline silicon-containing compounds (e.g., silicon carbide, etc.), crystalline III-V compound semiconductors, polycrystalline III-V compound semiconductors, amorphous III-V compound semiconductors, crystalline II-VI compound semiconductors, polycrystalline II-VI compound semiconductors, amorphous II-VI compound semiconductors, metals, and composite materials.

Accelerator layer 512 comprises a sacrificial material that etches in a first etchant that also etches the material of layer 510. Typically, the material of accelerator layer 512 is selected such that it etches at a faster rate in the first etchant than the material of layer 510. In this example, accelerator layer 512 comprises titanium and chrome; however the material of accelerator layer 512 is a matter of design choice and will depend on the material of layer 510 and available etchants.

At operation 602, mask layer 514 is formed and patterned on accelerator layer 512. Mask layer 514 is patterned to expose surface 518 of accelerator layer 512 in region 502, but protect surface 518 in regions 504 and 506. The edge of mask layer 514 is located at first end 520 (i.e., at z=0).

FIG. 5A depicts a cross-sectional view of substrate region 500 after mask layer 514 has been formed on accelerator layer 512.

At operation 603, substrate region 500 is exposed to etchant 524 at time t(0).

Etchant 524 comprises a chemical (e.g., nitric acid, etc.) that etches the material of accelerator layer 512 at a faster rate than the material of layer 510. As a result, accelerator layer 512 is removed quickly in region 502 and etchant 524 begins to attack underlying layer 510 uniformly across the region. At the same time, etchant 524 begins to etch accelerator layer 512 laterally along the z-direction from first end 520 toward second end 522, undercutting mask layer 514 along the z-direction. In some embodiments, accelerator layer 512 is removed from region 502 via a different etch (preferably, a directional etch) that removes its material selectively over the material of layer 510. This ensures a clean starting condition at first end 520 for the lateral etching of accelerator layer 512 in region 504. It can also improve the uniformity of the vertical etching of layer 510 in region 502.

FIG. 5B depicts a cross-sectional view of substrate region 500 during operation 603.

Etch front 526 moves along the z-direction at a substantially constant velocity, thus exposing a linearly increasing amount of surface 516.

At operation 604, the etching of layer 510 by etchant 524 is stopped at time t(1). Time t(1) is selected based on the etch rate of the material of layer 510 in etchant 524, initial thickness, h3, final thickness, h4, and the desired length, L2, of taper region 504.

Second end 522 is defined by the point at which etch front 526 is stopped at operation 604. As a result, no etching of layer 510 occurs at second end 522 (or in region 506) because etchant 524 has no time to attack layer 510 at surface 516. At second end 522 and in region 506, therefore, layer 510 remains at its deposited thickness, h3. At first end 520 and in region 502, however, etchant 524 etches layer 510 for substantially the entire time period from t(0) to t(1), resulting in final thickness, h4, for layer 510. Between first end 520 and second end 522, the exposure time of layer 510 in etchant 524 is a linearly decreasing function of distance along the z-direction from first end 520. Etchant 524, therefore, creates a linearly increasing thickness of layer 510 (from h4 to h3) from first end 520 to second end 522. It should be noted that the magnitude of the taper angle, θ1, is dependent upon the relative etch rates of the materials of accelerator layer 512 and layer 510 in etchant 524. The relationship between θ1 and these etch rates can be described as:

$$\theta 1 = \tan^{-1}\left(\frac{ER1}{ER2}\right),$$

where ER1 is the etch rate of the material of layer 510 and ER2 is the etch rate of the material of accelerator layer 512 in etchant 524.

FIG. 5C depicts a cross-sectional view of substrate region 500 after operation 604.

Figure 7A:
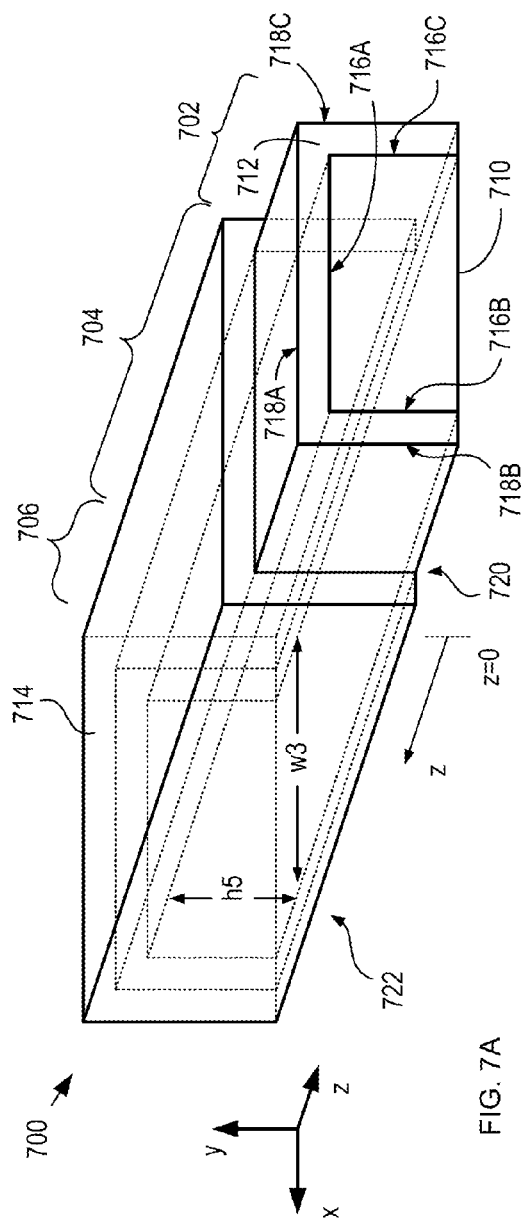
FIG. 7A depicts a schematic drawing of a perspective view of a substrate region suitable for forming a two-dimensional taper region in accordance with the present invention.

It is a further aspect of the present invention that the operations of method 600 can be used as the basis of a method for simultaneously tapering different surfaces of a layer that has surfaces in multiple dimensions. The example depicted in FIGS. 7A-C show the etching of layer 710 to taper surfaces in each of the x- and y-directions. Layer 710 is analogous to layer 510; however, layer 710 is patterned to form a ridge (sometimes referred to as a "stripe") structure that extends along the z-direction through each of regions 702, 704, and 706. As a result, layer 710 comprises surfaces in each of the x-z and y-z planes that can be tapered using the method of 600. It should be noted that, in this example, regions 702, 704, and 706, layer 710, accelerator layer 712, and mask layer 714 are analogous to regions 502, 504, and 506, layer 510, accelerator layer 512, and mask layer 514, respectively.

FIG. 7A depicts a schematic drawing of a perspective view of a substrate region suitable for forming a two-dimensional taper region in accordance with the present invention. FIG. 7A depicts substrate region 700 after operations 601 and 602 of method 600, where accelerator layer 712 and mask layer 714 are already formed on layer 710.

Layer 710 is patterned as a ridge structure that extends along the z-direction through each of regions 702, 704, and 706. Layer 710, as formed, has a rectangular cross-sectional shape having width, w3, and height, h5. Layer 710 comprises surfaces 716A, 716B, and 716C, which, collectively, are analogous to surface 516. Surface 716A lies in an x-z plane, and side surfaces 716B, and 716C lie in parallel y-z planes.

At operation 601, accelerator layer 712 is disposed on surfaces 716A, 716B, and 716C. As a result, accelerator layer 712 has surface 718A, which lies in an x-z plane, and side surfaces 718B, and 718C, which lie in parallel y-z planes.

At operation 602, mask layer 714 is formed on accelerator layer 712 such that it protects surfaces 718A, 718B, and 718C in regions 704 and 706 but exposes them in region 702.

At operation 603, substrate region 700 is exposed to etchant 524 at time t(0). Etchant 524 quickly removes accelerator layer 712 in region 702 and begins to etch surfaces 716A, 716B, and 716C of layer 710.

As described above, and with respect to FIGS. 5A-C and 6, etchant 524 begins to etch accelerator layer 712 laterally along the z-direction from first end 720 toward second end 722, undercutting mask layer 714 along the z-direction. The etch front of etchant 524 moves along the z-direction at a constant rate; therefore, the exposure of surfaces 716A, 716B, and 716C to etchant 524 increases as a linear function of time. As a result, the exposed surfaces of layer 710 are etched back by an amount that depends on their distance from first end 720. This results in the tapering of surface 716A in the y-direction and the tapering of each of surfaces 716B and 716C in the x-direction, thus forming taper region 704.

At operation 604, the etching of layer 710 and accelerator layer 712 is stopped at time t(1).

FIG. 7B depicts a schematic drawing of a top view of substrate region 700 after operation 604 and after the removal of the remaining areas of accelerator layer 712 and mask layer 714.

After the accelerator-layer tapering process, layer 710 includes ridge section 726 in region 706, ridge section 728 in region 702, and tapered-ridge section 730 in region 704.

FIGS. 7C and 7D depict schematic drawings of cross-sectional views of layer 710 through lines a-a and b-b, respectively. In region 706, depicted in FIG. 7C, ridge section 726 has width w3 and height h5, which are the same dimensions as layer 710 as initially formed. In region 702, depicted in FIG. 7D, ridge section 728 has reduced width w4 and height h6. In region 704, the dimensions of ridge section 728 increase substantially linearly from those of ridge section 728 to those of ridge section 726.

It is yet another aspect of the present invention that accelerator-layer tapering can be used to form Micro-Electro-Mechanical Systems-based (MEMS-based) or nanotechnology-based structures that have non-rectangular features in any of the x-, y-, and z-dimensions. Further, accelerator-layer tapering can be used to fabricate specialized surface waveguide devices, such as spotsize converters, mode-field converters, and the like.

Spotsize Converter

An illustrative embodiment of the present invention is a spotsize converter based on a TriPleX™ waveguide structure having a box-shape composite-core structure comprising an inner core of silicon dioxide surrounded by an annular shaped outer core of silicon nitride. TriPleX™ waveguide technology is described in U.S. Pat. No. 7,146,087, issued Dec. 5, 2006, which is incorporated herein by reference. Although the illustrative embodiment comprises a TriPleX™ waveguide structure, it will be clear to one skilled in the art, after reading this Specification how to specify, make, and use alternative embodiments of the present invention that comprise any suitable waveguide structure, with or without a composite core structure.

In the illustrative spotsize converter, accelerator-layer tapering is used to form a transition region wherein the surface waveguide is changed from high-index contrast to low index contrast, with a commensurate change in mode propagation characteristics. The transition region includes tapered layers in different dimensions via a method analogous to method 600, described above and with respect to FIGS. 6 and 7A-D.

FIGS. 8A-C depict schematic drawings cross-sectional views of a selection of exemplary waveguide structures suitable for use with the present invention.

FIG. 8A depicts a schematic drawing of a cross-sectional view of a surface waveguide structure in accordance with the illustrative embodiment of the present invention. Surface waveguide 800 is characterized by a TriPleX™ waveguide structure having a "box" shape composite core. Waveguide 800 comprises core 802, lower cladding 804, and upper cladding 806.

Composite core 802 includes inner core 808 and outer core 810. In the illustrative embodiment, inner core 808 is a ridge of stoichiometric silicon dioxide having a substantially square cross-sectional shape whose sides are within the range of approximately 400 nm to approximately 1.5 microns. In some embodiments, inner core 808 has a different shape, such as rectangular, irregular (e.g., a "u" shape, "T" shape, etc.).

Outer core 810 is a square annulus of stoichiometric silicon nitride. Outer core 810 comprises outer core 810 comprises lower core LC1, upper core UC1, and side cores SC1. Typically, upper core UC1 and side cores SC1 are formed simultaneously via conformal deposition of a single layer of outer core material on inner core 808. As a result, this conformal layer covers both the top surface and side surfaces of inner core 808 with a substantially equal amount of outer core material. Each of lower core LC1, upper core UC1, and side cores SC1 has a thickness, t1, that is within the range of 50 nm to approximately 300 nm. In some cases, one or more of lower core LC1, upper core UC1, and side cores SC1 has a thickness that is different from the other outer core portions.

Lower cladding 804 is a layer of thermally grown silicon dioxide having a thickness within the range of approximately 5 microns to approximately 10 microns.

Upper cladding 806 is a layer of deposited oxide having a thickness within the range of approximately 1 micron to approximately 2.5 microns.

FIG. 8B depicts a schematic drawing of a cross-sectional view of a second exemplary TriPleX™ waveguide structure that has a "sandwich structure" composite core. Waveguide structure 812 comprises composite core 814, lower cladding 804, and upper cladding 806.

Composite core 814 comprises lower core LC2, middle core 816, and upper core UC2. Middle core 816 is analogous to inner core 808, described above and with respect to FIG. 8A. Each of lower core LC2 and upper core UC2 is a layer of stoichiometric silicon nitride whose thickness, t2, is within the range of 50 nm to approximately 300 nm.

FIG. 8C depicts an exemplary high index-contrast channel waveguide structure having a pure silicon nitride core. Waveguide structure 818 comprises core 820, lower cladding 804, and upper cladding 806.

Core 820 is a ridge of stoichiometric silicon nitride having a substantially square cross-sectional shape whose sides are within the range of approximately 50 nm to approximately 300 nm. In some embodiments, core 820 has a different shape, such as rectangular, irregular (e.g., a "u" shape, "T" shape, etc.).

FIGS. 9A and 9B depict schematic diagrams of top and side views, respectively, of a surface waveguide-based spot-size converter formed using accelerator-layer tapering in accordance with an illustrative embodiment of the present invention. Spotsize converter 900 comprises high-index waveguide 902, taper region 904, and low-index waveguide 906. For clarity, upper cladding 912 is not shown in either of FIGS. 9A and 9B.

FIGS. 9C and 9D depict schematic diagrams of cross-sectional views through lines c-c and d-d, respectively, of spotsize converter 900. Line c-c is drawn through high-index waveguide 902 and line d-d is drawn through low-index waveguide 906.

Spotsize converter 900 provides both high and low index contrast TriPleX™ waveguides in the same PLC. High index contrast is ideal for tight waveguide curvatures needed in large-scale integration, whereas low index contrast is well suited to good fiber-to-chip coupling and low-loss waveguide crossings.

High-index waveguide 902 comprises composite core 908, lower cladding 910, and upper cladding 912.

Lower cladding 910 and upper cladding 912 are analogous to lower cladding 804 and upper cladding 806 described above and with respect to FIGS. 8A-C.

Composite core 908 comprises inner core 914 and outer core 916.

Inner core 914 comprises stoichiometric silicon dioxide. Inner core 914 has a substantially square cross-sectional shape having a size of approximately 1 micron on a side. In some embodiments, inner core 914 has a different shape and/or different dimensions. The dimensions of inner core 914 are substantially unchanged across high-index waveguide 902, taper region 904, and low-index waveguide 906.

Outer core 916 is a substantially square annulus of stoichiometric silicon nitride that surrounds inner core 914 in high index waveguide 902. Outer core 916 comprises lower core LC3, side cores SC3, and upper core SC3. Each of lower core LC3, side cores SC3, and upper core SC3 has a thickness substantially equal to t3. In the illustrative embodiment, t3 is approximately equal to 200 nm; however, it will be clear to one skilled in the art, after reading this Specification, how to specify, make, and use alternative embodiments of the present invention wherein t3 is any practical size.

Low-index waveguide 906 comprises composite core 922, lower cladding 910, and upper cladding 912.

Composite core 922 comprises inner core 914 and outer core 924.

Outer core 924 is a substantially square annulus of stoichiometric silicon nitride that surrounds inner core 914 in low index waveguide 906. Outer core 924 comprises lower core LC4, side cores SC4, and upper core SC4. Each of lower core LC4, side cores SC4, and upper core SC4 has a thickness substantially equal to t4. In the illustrative embodiment, t4 is approximately equal to 20 nm; however, it will be clear to one skilled in the art, after reading this Specification, how to specify, make, and use alternative embodiments of the present invention wherein t4 is any practical size.

Taper region 904 comprises composite core 926, lower cladding 910, and upper cladding 912.

Composite core 926 comprises inner core 914 and outer core 928.

Outer core 928 comprises lower core LC5, side cores SC5, and upper core UC5.

Each of lower core LC5, side cores SC5, and upper core UC5 comprises stoichiometric silicon nitride having a thickness that decreases substantially linearly from t3 to t4 along length L4 from high-contrast waveguide 902 to low-contrast waveguide 906. Length L4 is selected to enable an adiabatic transition (i.e., substantially lossless) for light conveyed through spotsize converter 900. In the illustrative embodiment, L4 is approximately 300 microns; however, it will be clear to one skilled in the art, after reading this Specification, how to specify, make, and use alternative embodiments of the present invention wherein L4 is any practical length.

FIG. 10 depicts operations of a method suitable for forming a spotsize converter in accordance with the illustrative embodiment of the present invention. Method 1000 is described with continuing reference to FIGS. 9A-D. Method 1000 begins with operation 1001, wherein lower cladding 910 is formed on an underlying silicon substrate. Lower cladding layer 910 is typically formed via conventional thermal oxidation to form a layer of silicon dioxide having a thickness within the range of approximately 4 microns to approximately 15 microns, and typically approximately 6 microns. In some embodiments, lower cladding layer 910 is formed via conventional low-pressure chemical vapor deposition (LPCVD), plasma-enhanced chemical vapor deposition (PECVD), or another suitable method.

At operation 1002, lower core layer 918 is formed on lower cladding layer 910. Lower core layer 918 is formed via one-dimensional accelerator-layer tapering, such as is described above, and with respect to FIGS. 5A-C and 6. Lower core layer 918 is deposited on lower cladding 910 as a substantially uniform layer of stoichiometric silicon nitride having a thickness of approximately 200 nm, which is the thickness of lower core LC3 of high-index waveguide 902. Accelerator-layer tapering is used to thin lower core layer 918 to the thickness of lower core LC4 in the region of low-index waveguide 906 and form the tapered thickness of lower core LC5 in taper region 904.

At operation 1003, inner core 914 is formed on lower core layer 918. Inner core 914 is formed by depositing a substantially uniform layer of stoichiometric silicon dioxide having a thickness of approximately 1 micron on lower core layer 918. This layer of silicon dioxide is then patterned via conventional photolithography and reactive-ion etching to form a ridge having a substantially uniform square cross-sectional shape that is approximately 1 micron on a side.

At operation 1004, upper core layer 920 is formed on inner core 914 and regions of lower core layer 918. Upper core layer 920 is formed via two-dimensional accelerator-layer tapering, such as is described above, and with respect to FIGS. 7A-D. Upper core layer 920 is deposited as a conformal layer of stoichiometric silicon nitride having a thickness of approximately 200 nm, which is the thickness of upper core UC3 and side cores SC3 of high-index waveguide 902. Because upper core layer 920 is a conformal layer, it deposits on all exposed surfaces of inner core 914 (i.e. its sides and top surface) and lower core layer 918 (i.e., the regions of lower core layer 918 outside the confines of inner core 914) at approximately the same thickness. Accelerator-layer tapering is used to thin upper core layer 920 to the thickness of upper core UC4 and side cores SC4 in the region of low-index waveguide 906 and form the tapered thickness of upper core UC5 and side cores SC5 in taper region 904.

After it has been formed, upper core layer 920, as well as lower core layer 918, is patterned via conventional photolithography and reactive-ion etching to define the square annulus shape of outer cores 916, 924, and 926. It should be noted that, in some embodiments, upper core layer 920 and lower core layer 918 are patterned in operation 1004 to define projections that extend laterally from inner core 914 in at least one of high-index waveguide 902, low-index waveguide 906, or taper region 904. These projections are included in some waveguide designs to affect the shape of the optical mode as it propagates through spotsize converter 900. In some embodiments, upper core layer 920 and lower core layer 918 are patterned to define the shape of outer cores 916, 924, and 926 prior to accelerator layer tapering of the upper core layer.

At operation 1005, upper cladding layer 912 is formed via a conventional deposition method, such as LPCVD, PECVD, and the like. Upper cladding layer 912 is a layer of silicon dioxide typically having a thickness within the range of approximately 4 microns to approximately 15 microns, and typically approximately 5 microns.

It should be noted that, in addition to spotsize converters, the present invention enables formation of mode-field converters that change the shape of an optical mode by asymmetrically changing the thickness of one or more of the layers that define a surface waveguide. For example, by changing the thickness of only the lower cores and upper cores (or, alternatively, the side cores), the aspect ratio of a propagating optical mode can be changed. In addition, for linearly polarized light propagating through spotsize converter 900, the TE polarization mode of a linearly polarized light signal is carried primarily in lower and upper cores while the TM polarization mode is carried primarily in the side cores. As a result, by selectively changing either the upper and lower cores or side cores, the polarization characteristics of the waveguide can be changed dramatically.

Further, in some embodiments, at least one of lower cladding 910 and upper cladding 912 is tapered using accelerator-layer tapering.

As discussed earlier, accelerator-layer tapering enables the simultaneous formation of one- or two-dimensional taper regions in a single material layer. In some embodiments of the present invention, the formation of a two-dimensional taper region, where the tapers are not orthogonal with one another can afford these embodiments considerable advantages. Further, by judicious design of mask features, taper regions having multiple taper angles, or even non-linear tapers can be created. In some cases, multiple taper angles or non-linear tapers can be beneficial. For example, a spotsize converter having a smaller taper angle at the fiber-facing end (i.e., proximal end) of the taper region than at the distal end of the taper region can, in some cases, have lower propagation loss than a spotsize converter having a linear taper region.

FIGS. 11A and 11B depict schematic drawings of top and side views, respectively, of a tapered waveguide core of a spotsize converter in accordance with an alternative embodiment of the present invention. Waveguide core 1100 comprises low-contrast region 1102, taper region 1104, and high-contrast region 1106. Low-contrast region 1102, taper region 1104, and high-contrast region 1106 are formed in core layer 1108 using accelerator-layer tapering, as described above. Taper region 1104 includes first taper region 1110 and second taper region 1112, each of which has a different taper angle. In each of low-contrast region 1102 and high-contrast region 1106, waveguide core 1100 has a substantially rectangular cross-section and is analogous to silicon nitride core 820 described above and with respect to FIG. 8C. FIG. 11 depicts waveguide core 1100 after operation 604 but prior to the removal of mask layer 1116 and accelerator layer 1114.

In forming waveguide core 1100, mask layer 1116 is formed on the surface of accelerator layer 1114 and patterned to define opening 1122, wedge 1124, and field region 1126. Opening 1122 defines the area of low-contrast region 1102. Wedge 1124 has sides that form angle $\theta1$ relative to line 1128 and $\theta2$ relative to propagation axis 1130. Line 1128 is a line normal to optical propagation axis 1130, as shown. Field region 1126 protects second taper region 1112 and high-contrast region 1006 in the same manner as is described above and with respect to one-dimensional accelerator-layer tapering.

Wedge 1124 protects core layer 1108 and accelerator layer 1114 from vertical attack during the taper etch that forms taper region 1104; however, accelerator layer 1114 enables accelerator-layer etching of the core layer to proceed along three directions—the z-direction, direction 1138, and direction 1140, as shown. As a result, accelerator layer 1114 is etched laterally at a faster rate in first taper region 1110 than in second taper region 1112, resulting in a more gradual tapering of core layer 1008 in first taper region 1110 than in second taper region 1112. Iso-height profiles 1134 indicate vertical height changes of 10 nm. The more gentle height change in first taper region 1110 defines a substantially linear slope having an angle $\theta2$ with respect to the original top surface of core layer 1108, while the more rapid height change in second taper region 1112 defines a substantially linear slope having an angle $\theta3$ with respect to the original top surface of core layer 1108. Boundary 1142 denotes an approximate transition between first taper region 1110 and second taper region 1112. Boundary 1144 denotes an approximate transition between second taper region 1112 and high-contrast region 1106. It should be noted that even though the thickness of core layer 1108 changes at two different rates as a function of distance along taper region 1104, it changes monotonically. In some embodiments, taper region 1104 includes at least one sub-region wherein the thickness of core layer 1108 changes in a non-linear fashion.

The value of θ3 depend on the relative etch rates of accelerator layer 1114 and core layer 1108, as described above and with respect to θ1 of FIG. 5C. The value of θ2, however, is also dependent upon angle θ1 of wedge 1124, as follows:

$$\theta 2 = \tan^{-1}\left(\cos(\Phi 1)\frac{ER1}{ER2}\right),$$

Figure 12:
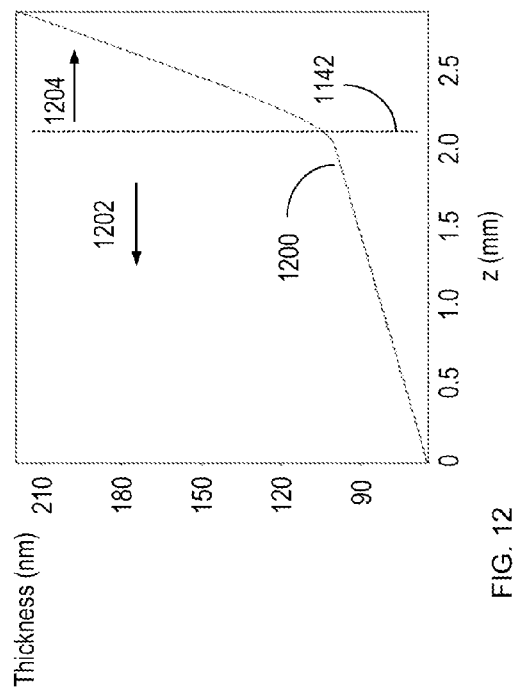
FIG. 12 depicts a plot of taper profile for an exemplary double-angle taper region in accordance with the alternative embodiment of the present invention.

FIG. 12 depicts a plot of taper profile for an exemplary double-angle taper region in accordance with the alternative embodiment of the present invention. Plot 1200 shows the thickness of a taper region of a core layer formed using a wedge 1124 having angle θ1 of approximately 85° and, therefore, an angle θ2 of approximately 5°. In taper region 1202, taper angle θ2 is approximately 0.001°, while in taper region 1204, taper angle θ3 is approximately 0.010°. Boundary 1142 denotes the approximate transition between angles θ2 and θ3.

Figure 13B:
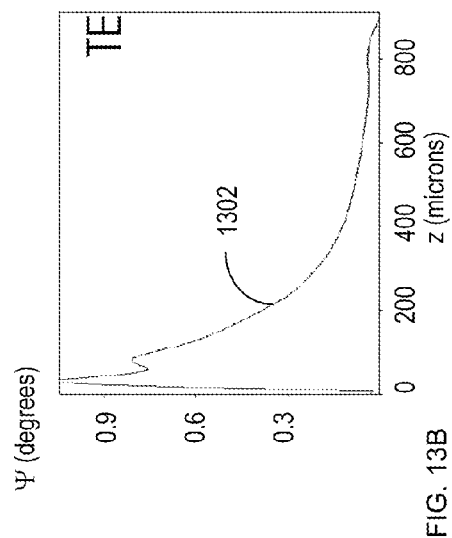
FIGS. 13A and 13B depict plots of a mode profile induced by an exemplary double-angle taper region and a single-angle linear taper region, respectively.
Figure 13A:
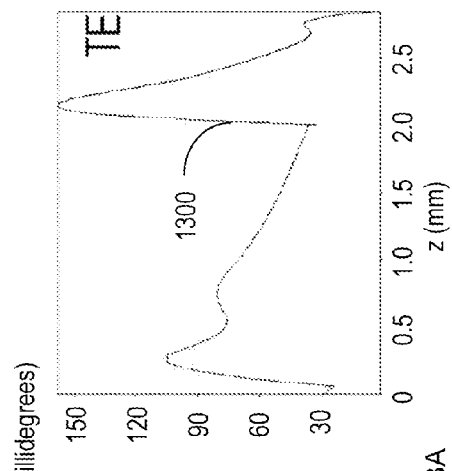

FIGS. 13A and 13B depict plots of a mode profile induced by an exemplary double-angle taper region and a single-angle linear taper region, respectively.

Plot 1300 shows the mode profile angle, Ψ, induced by the taper angle of a double-angle linear taper having taper angles θ2 and θ3 of 0.001° and 0.010°, respectively, (such as is described in FIGS. 11 and 12) for TE polarized light at 1550 nm. For comparison, plot 1302 shows the mode profile angle, Ψ, induced by the taper angle of a simple linear taper for TE polarized light at 1550 nm. Clearly, the angle of the mode profile induced by the double-angle taper region is improved over that of the simple linear taper region.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   providing a first layer of a first material, wherein the first material etches at a first etch rate in a first etchant;
   providing an accelerator layer disposed on the first layer, the accelerator layer comprising a second material, wherein the second material etches at a second etch rate in the first etchant;
   providing a mask layer, wherein the mask layer is disposed on the accelerator layer in a first region, and wherein the mask layer is provided such that it comprises a field region and a wedge region that extends from the field region along a first lateral direction, the wedge region having a first edge and a second edge;
   laterally etching the accelerator layer in the first etchant such that the wedge region is undercut along the first lateral direction and such that the first layer is exposed to the first etchant for a longer period of time at a first point that at a second point;
   laterally etching the accelerator layer in the first etchant such that the wedge region is undercut along a second lateral direction that is normal to the first edge and a third lateral direction that is normal to the second edge, wherein the first lateral direction, second lateral direction, and third lateral direction are non-parallel and non-orthogonal; and
   etching the first layer in the first region in the first etchant such that the thickness of the first layer increases monotonically from each of (1) the first point to the second point, (2) a third point to a fourth point along the second lateral direction, and (3) a fifth point to a sixth point along the third lateral direction.

2. The method of claim 1 wherein the first etchant is enabled to laterally etch the accelerator layer along the first lateral direction from the second point to a third point in the first region at a second lateral etch rate.

3. The method of claim 2 further comprising etching the first layer in the first region such that the thickness of the first layer increases substantially linearly along the first lateral direction from the second point to the third point, wherein the thickness increases at a first rate from the first point to the second point and a second rate from the second point to the third point, and wherein the first rate and second rate are different.

4. The method of claim 1 wherein the wedge region projects from the field region along a first axis that is substantially aligned with the first lateral direction, and wherein the wedge region includes two edges, each of which forms an angle with the first axis that is greater than 0 degrees and less than 90 degrees.

5. The method of claim 4 wherein the angle is greater than 0 degrees and less than 10 degrees.

6. The method of claim 1 further comprising providing the first etchant such that the second etch rate is faster than the first etch rate.

7. The method of claim 1 further comprising etching the accelerator layer in a second region in the first etchant, wherein the second region abuts the first region at the first point, and wherein the first layer is exposed to the first etchant for substantially the same time in the second region as at the first point.

8. The method of claim 1 further comprising protecting the first layer from the first etchant in a second region that abuts the first region at the second point.

9. The method of claim 1 further comprising:
   providing a second layer of a third material, the second layer having a substantially uniform thickness in the first region; and
   providing a third layer of a fourth material, wherein the third layer has a thickness that increases monotonically along the first lateral direction from the first point to the second point;
   wherein the first layer is disposed on the second layer, and wherein the second layer is disposed on the third layer.

10. The method of claim 1:
   wherein the first layer is provided such that it has a substantially rectangular cross-section having a width and a height and such that the first layer includes a first surface and a second surface that is substantially orthogonal to the first surface; and
   wherein the accelerator layer is provided such that it is disposed on each of the first surface and second surface;
   wherein the first etchant is enabled to laterally etch the accelerator layer such that each of the first surface and the second surface are exposed to the first etchant for a longer period of time at the first point than at the second point; and
   wherein the first layer is etched such that each of the width and height increases substantially linearly from the first point to the second point.

11. The method of claim 1 further comprising:
providing the first layer such that it is disposed on a second layer of a third material, wherein the third material is etched at a third etch rate by the first etchant, and wherein the second layer is provided such that the thickness of the second layer increases monotonically along the first lateral direction from the first point to the second point.

12. The method of claim 11 further comprising providing a third layer, wherein the second layer is disposed on the third layer, and wherein the third layer comprises the first material, and further wherein the third layer is provided such that the thickness of the third layer increases monotonically along the first lateral direction from the first point to the second point:
wherein the first layer, second layer, and third layer collectively define a structure suitable for conveying a first light signal, and wherein the structure has a mode-field diameter for the light signal that is different at each of the first point and the second point, and further wherein the mode-field diameter changes monotonically along the distance between the first point and the second point.

13. The method of claim 12 wherein the first material is characterized by a refractive index that is lower than the refractive index of the third material, and wherein the first layer, second layer, and third layer collectively define a surface waveguide.

14. The method of claim 12 wherein the refractive index of the first material is higher than the refractive index of the third material, and wherein the first layer, second layer, and third layer collectively define the core of a composite-core surface waveguide.

15. A method comprising:
providing a substrate having a first region, second region, and third region that is between the first region and second region;
providing a first layer of a first material disposed on the substrate, wherein the first layer has a first thickness in the first region and a second thickness in the second region, and wherein the thickness of the first layer in the third region changes monotonically from the first thickness at a first point to the second thickness at a second point, and wherein the first layer is provided by operations comprising:
(i) forming the first layer with a thickness equal to the second thickness;
(ii) forming an accelerator layer of a second material on the first layer, the accelerator layer having a first surface;
(iii) forming a mask layer on the accelerator layer, wherein the mask layer exposes the first surface in the first region and is disposed on the first surface in the second region and third region, and wherein the mask in the third region includes a field region and a wedge region that projects from the field region along a first axis that is aligned with a first direction, the wedge region having first and second edges that each form a non-zero acute angle with the first axis, wherein the first edge is normal to a second direction and the second edge is normal to a third direction;
(iv) etching the accelerator layer and the first layer in the first region via a first etchant that etches the first material with a first etch rate and the second material at a second etch rate, wherein the first layer is etched for a first time period;
(v) laterally etching the accelerator layer via the first etchant along the first direction from the first point to the second point such that the first layer is exposed to the first etchant at the first point for the first time period and such that the first layer is substantially unexposed to the first etchant at the second point; and
(vi) laterally etching the accelerator layer via the first etchant along each of the second direction and third direction.

16. The method of claim 15 further comprising:
providing a second layer of a third material disposed on the first layer, wherein the second layer has third thickness in the first region and a fourth thickness in the second region, and wherein the thickness of the second layer in the third region changes substantially linearly from the third thickness at the first point to the fourth thickness at the second point; and
providing a third layer of a fourth material disposed on the second layer, wherein the third layer has fifth thickness in the first region and a sixth thickness in the second region, and wherein the thickness of the third layer in the third region changes substantially linearly from the fifth thickness at the first point to the sixth thickness at the second point.

17. The method of claim 16 further comprising:
providing a first waveguide structure in the first region, the first waveguide structure comprising the first layer, the second layer, and the third layer, wherein the first waveguide structure has a first optical mode-field size; and
providing a second waveguide structure in the second region, the second waveguide structure comprising the first layer, the second layer, and the third layer, wherein the second waveguide structure has a second optical mode-field size that is different from the first optical mode-field size.

18. The method of claim 16 wherein the first layer is provided such that it comprises silicon nitride, the second layer is provided such that it comprises silicon dioxide, and the third layer is provided such that it comprises silicon nitride, and wherein the first layer, second layer, and third layer collectively define a composite core of a composite-core waveguide structure, and further wherein the composite-core waveguide structure has a first optical mode-field size in the first region and a second optical mode-field size in the second region, the first optical mode-field size and the second optical mode-field size being different.

19. The method of claim 16 wherein the second layer is provided such that it has a substantially rectangular cross-sectional shape having a width and a height, the height being defined by the thickness of the second layer, and wherein the second layer has a first width in the first region and a second width in the second region, and wherein the width of the second layer in the third region changes substantially linearly from the first width at the first point to the second width at the second point.

20. The method of claim 16 wherein the first layer, second layer, and third layer are provided such that the third material has a refractive index that is higher than the refractive indices of each of the first material and the fourth material, and wherein the first layer, second layer, and third layer collectively define a surface waveguide structure having a first optical mode-field size in the first region and a second optical mode-field size in the second region, the first optical mode-field size and the second optical mode-field size being different.

21. The method of claim 15 further comprising:
providing a second layer of a third material disposed on the first layer, wherein the second layer has substantially uniform thickness in the first region, the second region, and third region; and providing a third layer of a fourth material disposed on the second layer, wherein the third layer has fifth thickness in the first region and a sixth thickness in the second region, and wherein the thickness of the third layer in the third region changes substantially linearly from the fifth thickness at the first point to the sixth thickness at the second point.

22. The method of claim 21 wherein the second layer is provided such that it has a substantially rectangular cross-section, and wherein the third layer is provided such that it is a substantially conformal coating on the second layer.

23. The method of claim 12, wherein the structure is characterized by a first refractive-index contrast at the first point and a second refractive-index contrast at the second point, and wherein the structure is characterized by a refractive-index contrast that changes monotonically between the first point and the second point.

24. The method of claim 15 wherein each of the first and second edges forms an angle with the first axis that is greater than 0 degrees and less than 10 degrees.

25. The method of claim 15 wherein laterally etching the accelerator layer along the second direction exposes the first layer to the first etchant at a third point for the first time period and exposes the first layer to the first etchant at a fourth point for a time period that is less than the first time period.

26. The method of claim 25 wherein laterally etching the accelerator layer along the third direction exposes the first layer to the first etchant at a fifth point for the first time period and exposes the first layer to the first etchant at a sixth point for a time period that is less than the first time period.

27. A method comprising:
providing a first layer of a first material disposed on a substrate that defines a first plane, wherein the first material etches at a first etch rate in a first etchant, and wherein the first layer has a substantially rectangular cross-section having a width and a height, and further wherein the first layer includes a first surface and a second surface that is substantially orthogonal to each of the first surface and the first plane;
providing a first accelerator layer disposed on each of the first surface and second surface, the first accelerator layer comprising a second material, wherein the second material etches at a second etch rate in the first etchant;
providing a first mask layer, wherein the first mask layer is disposed on the first accelerator layer in a first region;
laterally etching the first accelerator layer in the first etchant along a first direction from a first point in the first region to a second point in the first region such that each of the first surface and second surface is exposed to the first etchant for a longer period of time at the first point than at the second point; and
etching the first layer in the first region such that each of the width and height changes monotonically from the first point to the second point.

28. The method of claim 26 further comprising providing a second layer of a second material such that the second layer is disposed on the first surface and the second surface, wherein the second layer has a first thickness on the first surface and a second thickness on the second surface, and wherein each of the first thickness and second thickness changes monotonically from the first point to the second point.

* * * * *